United States Patent [19]
Beery

[11] 3,760,252
[45] Sept. 18, 1973

[54] DAMPING OF A STEP SERVO MOTOR USING ONE STEP ANTICIPATION LOGIC

[75] Inventor: Jack Beery, Farmington, Mich.

[73] Assignee: Burroughs Corporation, Detroit, Mich.

[22] Filed: July 5, 1972

[21] Appl. No.: 269,164

[52] U.S. Cl. ................ 318/611, 318/601, 318/685
[51] Int. Cl. ............................................. G05b 5/01
[58] Field of Search ................... 318/685, 601, 611

[56] References Cited
UNITED STATES PATENTS

| | | | |
|---|---|---|---|
| 3,573,589 | 4/1971 | Berry | 318/685 X |
| 3,541,418 | 11/1970 | Agin et al. | 318/685 X |
| 3,636,429 | 1/1972 | Jakubowski et al. | 318/685 |
| 3,463,985 | 8/1969 | Fredriksen | 318/685 |
| 3,575,653 | 4/1971 | Gucwa | 318/685 |
| 3,644,812 | 2/1972 | Bitto | 318/685 X |

*Primary Examiner*—B. Dobeck
*Attorney*—Paul W. Fish et al.

[57] ABSTRACT

A damping means for a stepper motor that will enable the motor to rotate between any two positions in either direction in a minimum of time. During rotation the actual position of the rotor is compared to the destination position and this comparison, in light of the direction of rotation, is utilized to determine when the rotor is one step from the destination. When the rotor reaches the point one step from the final position, a damping signal causes the energization of the stator coils thus producing a damping force that will prevent overshoot and oscillation about the destination position by gradually reducing the rate of angular rotation of the motor as it approaches the final position.

4 Claims, 6 Drawing Figures

Patented Sept. 18, 1973 3,760,252
5 Sheets-Sheet 1
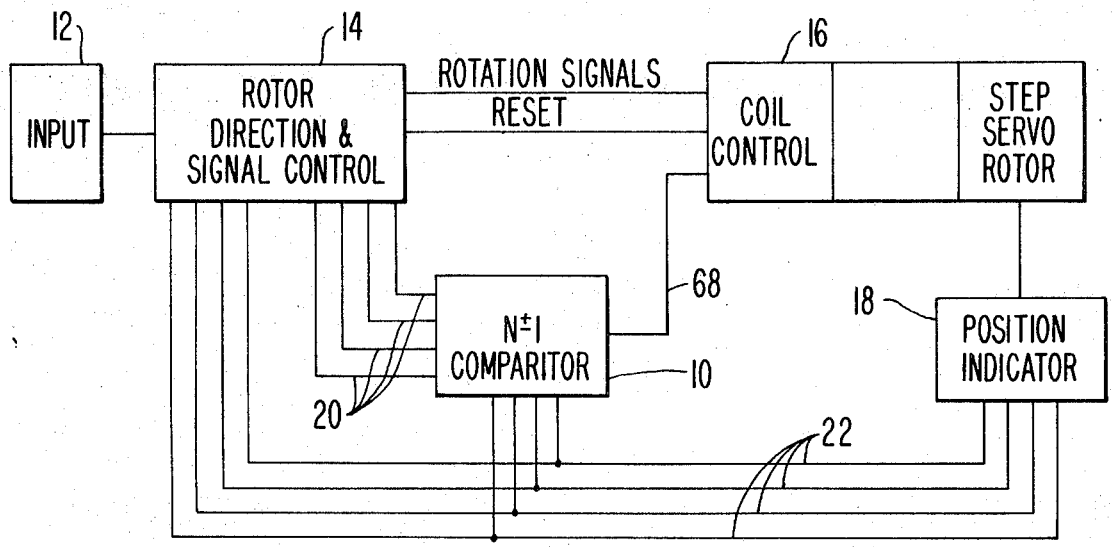
FIG.1
FIG.4
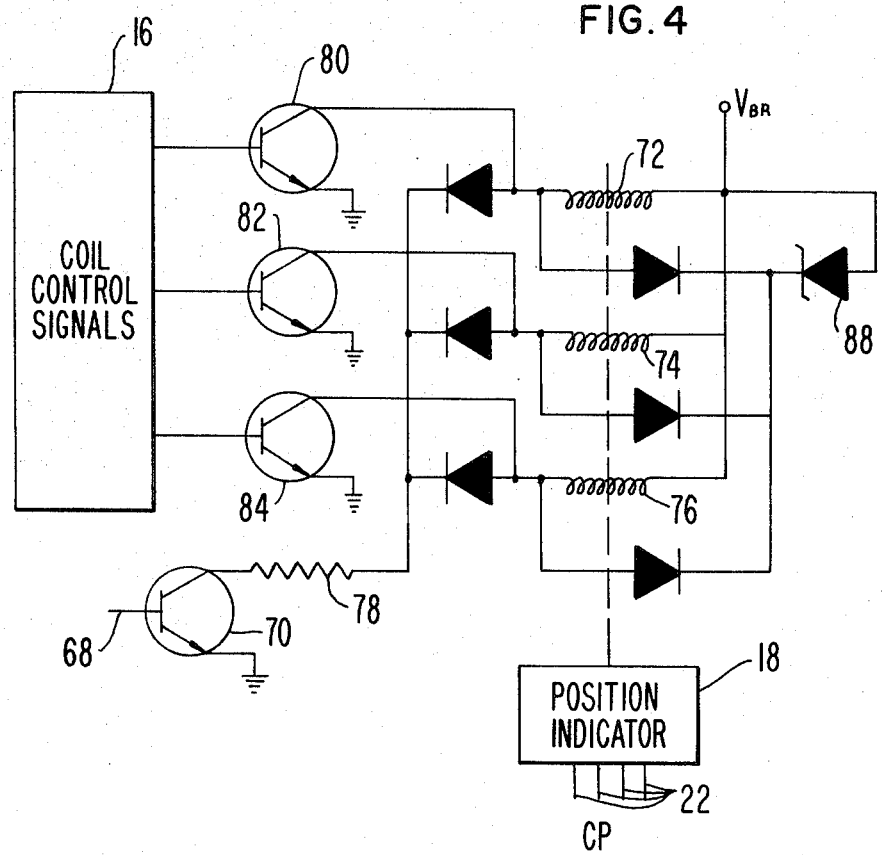

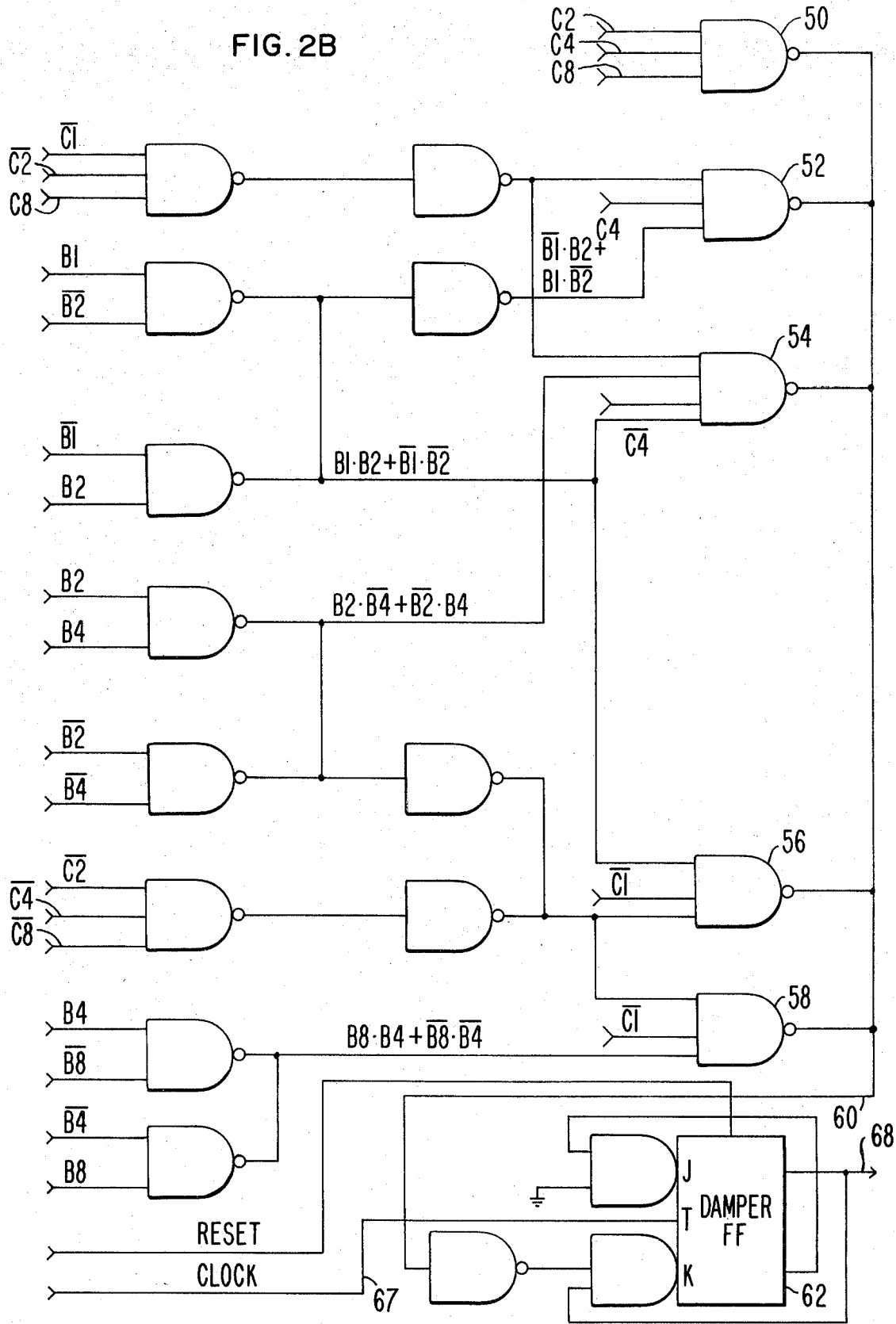

PC SIGNAL — 63

| | | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|---|
| | PC 1 | 0 | 1 | 0 | 1 | 0 | 1 | 0 | 1 | 0 | 1 | 0 | 1 | 0 | 1 | 0 |
| | PC 2 | 0 | 0 | 1 | 1 | 0 | 0 | 1 | 1 | 0 | 0 | 1 | 1 | 0 | 0 | 1 |
| | PC 4 | 0 | 0 | 0 | 0 | 1 | 1 | 1 | 1 | 0 | 0 | 0 | 0 | 1 | 1 | 1 |
| | PC 8 | 0 | 0 | 0 | 0 | 0 | 0 | 0 | 0 | 1 | 1 | 1 | 1 | 1 | 1 | 1 |

↑ 64

B SIGNAL

| B1 B2 B4 B8 | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 0 0 0 | X | 0 | 1 | 1 | 1 | 1 | 1 | 1 | 1 | 1 | 1 | 1 | 1 | 1 | 0 |
| 1 0 0 0 | 0 | X | 0 | 1 | 1 | 1 | 1 | 1 | 1 | 1 | 1 | 1 | 1 | 1 | 1 |
| 0 1 0 0 | 1 | 0 | X | 0 | 1 | 1 | 1 | 1 | 1 | 1 | 1 | 1 | 1 | 1 | 1 |
| 1 1 0 0 | 1 | 1 | 0 | X | 0 | 1 | 1 | 1 | 1 | 1 | 1 | 1 | 1 | 1 | 1 |
| 0 0 1 0 | 1 | 1 | 1 | 0 | X | 0 | 1 | 1 | 1 | 1 | 1 | 1 | 1 | 1 | 1 |
| 1 0 1 0 | 1 | 1 | 1 | 1 | 0 | X | 0 | 1 | 1 | 1 | 1 | 1 | 1 | 1 | 1 |
| 0 1 1 0 | 1 | 1 | 1 | 1 | 1 | 0 | X | 0 | 1 | 1 | 1 | 1 | 1 | 1 | 1 |
| 1 1 1 0 | 1 | 1 | 1 | 1 | 1 | 1 | 0 | X | 0 | 1 | 1 | 1 | 1 | 1 | 1 |
| 0 0 0 1 | 1 | 1 | 1 | 1 | 1 | 1 | 1 | 0 | X | 0 | 1 | 1 | 1 | 1 | 1 |
| 1 0 0 1 | 1 | 1 | 1 | 1 | 1 | 1 | 1 | 1 | 0 | X | 0 | 1 | 1 | 1 | 1 |
| 0 1 0 1 | 1 | 1 | 1 | 1 | 1 | 1 | 1 | 1 | 1 | 0 | X | 0 | 1 | 1 | 1 |
| 1 1 0 1 | 1 | 1 | 1 | 1 | 1 | 1 | 1 | 1 | 1 | 1 | 0 | X | 0 | 1 | 1 |
| 0 0 1 1 | 1 | 1 | 1 | 1 | 1 | 1 | 1 | 1 | 1 | 1 | 1 | 0 | X | 0 | 1 |
| 1 0 1 1 | 1 | 1 | 1 | 1 | 1 | 1 | 1 | 1 | 1 | 1 | 1 | 1 | 0 | X | 0 |
| 0 1 1 1 | 0 | 1 | 1 | 1 | 1 | 1 | 1 | 1 | 1 | 1 | 1 | 1 | 1 | 0 | X |

DAMPING OF A STEP SERVO MOTOR USING ONE STEP ANTICIPATION LOGIC

BACKGROUND OF THE INVENTION

Stepper motors are used in servo mechanisms for a variety of purposes, including printing devices, and since it is considered desirable in many of these applications to have these devices function at high rates of speed it is necessary to have stepper motors that will reach a new position in a minimum of time. One of the basic problems regards the dichotomy of rotating the rotor at a high rate of speed in order to reach the final position as quickly as possible and at the same time, when the rotor of the stepper motor arrives at that final position, is to have little or no overshoot or oscillation of the rotor so that whatever function the device is to perform may be carried out immediately. It was with the purpose of optimizing the speed of a stepping motor rotating a print wheel in a printing device that the present damping technique was devised.

The prior art discloses a number of approaches to the problem of how to effectively damp a servo motor in order to achieve quick response. One of the traditional approaches to this problem has been to use various mechanical or electro-mechanical devices such as viscous damping, ratchet and pawl detent mechanisms, and other electro-mechanical devices. Some of the disadvantages of these approaches included high cost, long braking times and excessive complexity which resulted in short life and unreliable operation. More recently some other approaches to the problem have been taken, including: the use of a braking pulse in certain selected coils after the final drive pulse; the generation of reversing pulses for each step of the servo or stepper motor; the use of timed energization of certain coils; and the use of a reversing pulse to the induction coils followed by a short forward pulse to drive the servo motor into the final position. It has been found, however, that these methods have certain basic disadvantages such as slow response time or require additional information such as the velocity of the rotor which in turn calls for large amounts of complicated and expensive components.

The primary purpose, then, of the present invention is to optimize the time of rotation of a stepper motor between any two positions while utilizing a minimum of components.

SUMMARY OF THE INVENTION

It is accordingly an important object of the present invention to provide improved means for electronically damping a servo motor in order to prevent any overshoot or oscillation about the final position to which it is being rotated and at the same time provide for a rapid movement to that final position. It is a further important object of this invention to provide efficient damping with the use of a minimum of electronic and mechanical components.

This invention is basically an improvement on the servo control system disclosed in the Beery U.S. Pat. No. 3,573,589 in that novel circuitry has been added to determine when the rotor is one step away from its final position regardless of the direction of its rotation. The invention therefore primarily resides in the addition to the circuitry disclosed in the Beery patent of an N plus or minus one (N±1) comparator circuit, which determines when the rotor is one step N±1 from its final position N.

The invention is used in a system which has a rotor directional control unit that determines which is the shortest rotational distance in terms of angular displacement clockwise (CW) or counterclockwise (CCW), between the present position of the rotor and the selected or final position of the rotor. This rotor directional control unit then generates a series of pulses to energize the stepper motor's induction coils thereby causing the rotor in the stepper motor to move in the desired direction. There is also a position indicator unit that determines what position the rotor is in at each point in time. Signals from the rotor directional control unit are sent to the N±1 comparator that represent the selected position of the rotor. At the same time, signals are sent from the position indicator to the N±1 comparator that indicate the current position of the rotor. These two sets of signals are continuously compared in the N±1 comparator and when the rotor is one step from the final destination a damping signal is generated. This damping signal will energize the induction coils to damp the motion of the rotor and to bring it smoothly into its final position without overshoot or oscillation. At the same time the counter torque generated by the de-energization of each of the rotor windings will be controlled by a zener diode in the coil control circuit thereby controlling the rate of angular rotation of the rotor.

Various other objects, advantages and meritorious features of the invention will become more fully apparent from the following description, appended claims and the accompanying drawings.

BRIEF DESCRIPTION OF THE DRAWINGS

FIG. 1 is a block diagram illustrating the control circuit of the step servo motor in which the invention resides;

FIGS. 2A and 2B are schematic diagrams of the N±1 comparator circuitry;

FIG. 3 is a table indicating the state of the damper driver as generated by the N±1 comparator for the selected positions of the rotor as compared to the actual position of the rotor;

FIG. 4 is a schematic diagram of the damping and coil control circuit; and

DESCRIPTION OF THE PREFERRED EMBODIMENT

Figure 2A:
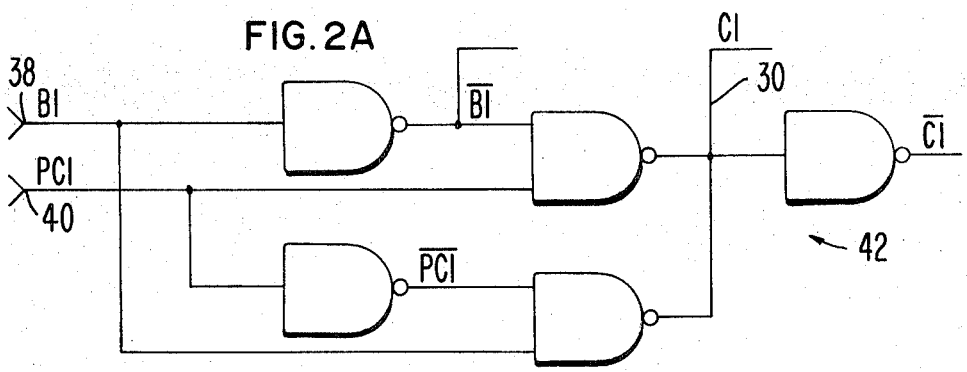
Figure 2A:
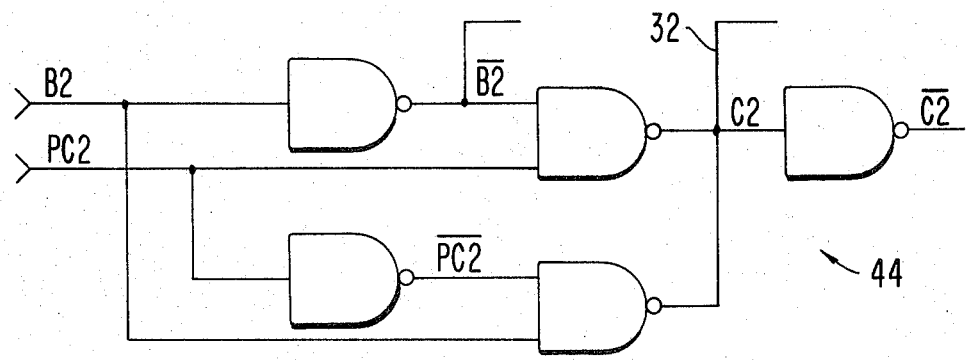
Figure 2A:
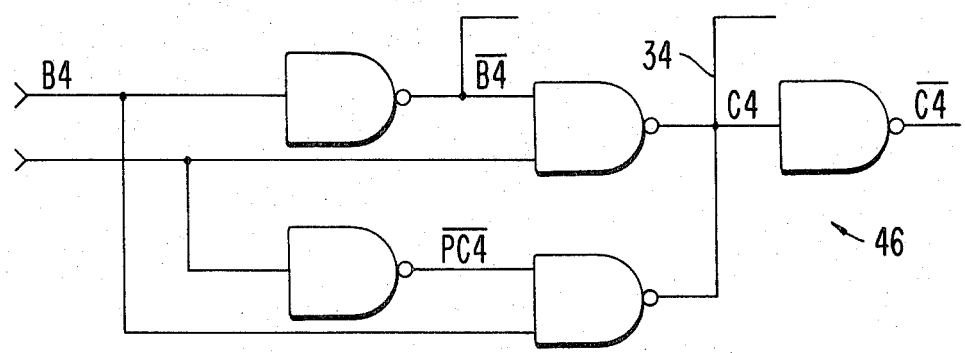
Figure 2A:
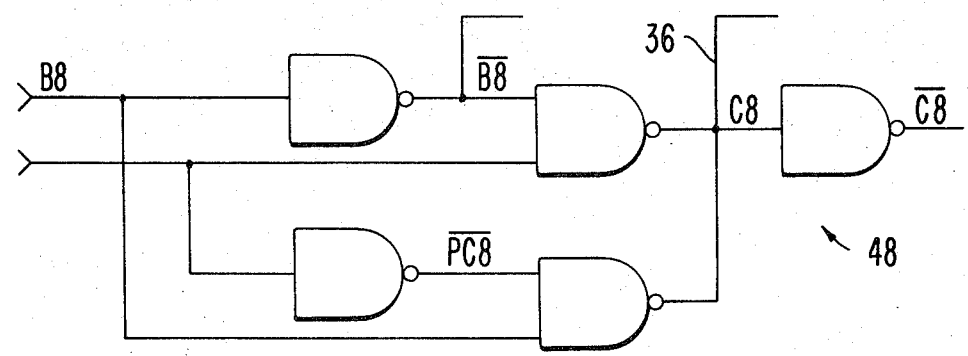

The system as illustrated in FIG. 1 is the same as the system disclosed in the Beery U.S. Pat. No. 3,573,589 but with the addition of the N±1 comparator generally indicated at 10 in FIG. 1. Other than the N±1 comparator 10 of FIG. 1, the blocks shown in FIG. 1 represent precisely the same elements as are illustrated in FIG. 1 of the referenced Beery patent and described therein. For example, the input block 12 of FIG. 1 is equivalent to the keyboard illustrated in FIG. 1 of the Beery patent and the rotor direction and signal control signal block 14 encompasses the pulse generator, direction control and comparator shown in FIG. 1 of the Beery patent. In addition, in FIG. 1 block 16 shown as the coil control and step servo rotor mechanism includes the coil control, coil driver, rotor damper, and the step servo rotor shown in FIG. 1 of the Beery patent. The position indicator 18 is the same as the position indicator shown in FIG. 1 of the Beery patent. Since both the nature and the function of all but one of the elements shown in the Beery patent are the same as disclosed herein the several blocks of the former have been combined for simplicity of representation in the present disclosure and to more clearly point out the addition of the missing element, namely the N±1 comparator 10.

The N±1 comparator 10 receives basically two sets of signals, the first signal received via lines 20 is a binary representation of the selected position of the rotor, or the B signal, and the second signal received via lines 22 is a binary representation of the present position of the rotor, or the PC signal. The function of the N±1 comparator then is to compare these two signals and when the PC signal representing the current position of the rotor is within one step of the position represented by the B signal, the N±1 comparator will trigger the damping signal, thus causing the coil control circuit unit 16 to apply the damping current to the stator coils of the motor.

The B and PC signals are binary representations of the selected position and the actual position of the rotor respectively. In this embodiment the rotor has 15 positions and the associated B and PC signals representing these positions are indicated in Table 1.

TABLE 1

| Position: | PC8 B8 | PC4 B4 | PC2 B2 | PC1 B1 |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 0 | 0 | 0 | 0 | 0 |

Upon entering a new position for the print wheel in the input device 12 of FIG. 1 the rotor direction and signal control circuitry 14 will generate the B signal input 20 into the N±1 comparator 10. At the same time the N±1 comparator will receive PC signals via lines 22 from the rotor position indicator 18 which represents the present position of the rotor.

The two basic elements of logic circuitry that are required to compare the B signal and the PC signal in order to determine when the rotor is one step from its final position are illustrated in FIGS. 2A and 2B. Each element of the N±1 comparator logic circuitry is composed of NAND gates as shown in FIGS. 2A and 2B. The function of the first logic element of the N±1 comparator circuitry shown in FIG. 2A is to determine when there is a match between each component of the B signal and the PC signals. The product of this comparison as shown in FIG. 2A is the comparison signal or the C output signal 30, 32, 34 and 36. As an example, taking the B1 component of the B signal 38 and comparing it to the PC1 component of the PC signal 40, the circuitry or logic 42 will generate the C1 signal 30 according to the formula $C1 = B1 \cdot \overline{PC1} + \overline{B1} \cdot PC1$ for which the truth table is illustrated in Table 2.

TABLE 2

$C1 = B1 \cdot \overline{PC1} + \overline{B1} \cdot PC1$

| B1 | PC1 | C1 |
|---|---|---|
| 0 | 0 | 1 |
| 1 | 0 | 0 |
| 0 | 1 | 0 |
| 1 | 1 | 1 |

In effect, each elemental circuit of the comparator 10 shown in FIG. 2A, i.e., 42, 44, 46 and 48, will generate a positive C signal component 30, 32, 34, 38 when there is a match between the respective B signal and the PC signal components.

Figure 5:
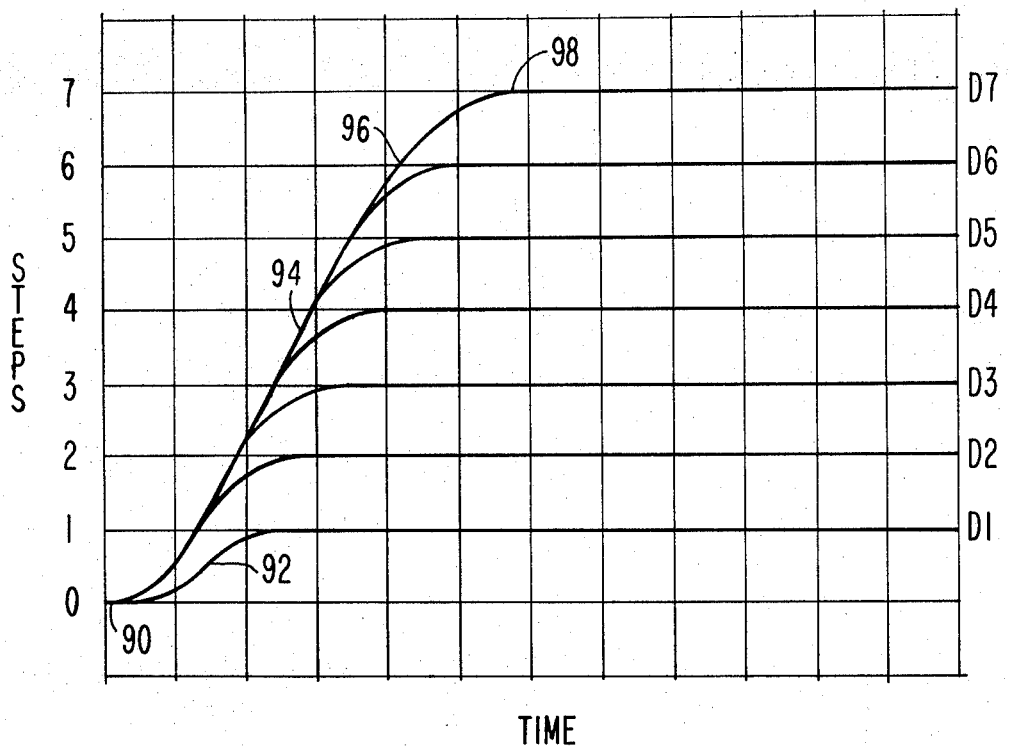
FIG. 5 is a graph of the displacement of the rotor versus time.

The second logic element of the N±1 comparator circuitry as illustrated in FIG. 2B logically compares the C signal outputs of FIG. 2A and the B signals, representing the selected location of the print wheel, resulting in one or more of the final logic elements, 50, 52, 54, 56 or 58 of FIG. 2B turning to ground or zero when the rotor is one step away from its final position or when it is at its final position. These final logic elements are connected by a common lead 60 to the damper flip flop 62 which upon an N±1 match will change its state thus triggering a damping signal to the damper circuitry as shown in FIG. 5.

In FIG. 3 is a logic table that indicates the output of the N±1 comparator circuitry as generated in response to the B signal and the PC signal. The horizontal axis of the table in FIG. 3 indicates both the decimal 63 and the binary representation 64 of the PC signal. The vertical axis is a binary representation 65 of the selected position signal or the B signal. The output 66 of the N±1 comparator is shown in FIG. 3 for every combination of PC signals 64 and B signal 65. Whenever the value of the actual position signal PC 64 is within plus or minus one of the value of the selected position N as represented by the B signal 65, the N±1 comparator circuitry will switch off one or more of its final logic elements 50, 52, 54, 56, 58 shown in FIGS. 2B, thus producing as indicated by 66 of FIG. 3 a zero or ground voltage on line 60. It is, then, by the use of this circuitry illustrated in FIGS. 2A and 2B that the system is able to detect when the rotor is one step away from its final position regardless of the direction of rotation.

As an example of how the circuitry illustrated in FIG. 2A and FIG. 2B functions, assume that the rotor is approaching the selected position seven and is now one step away at position six. Each element of the B signal and the PC signal would be compared in FIG. 2A resulting in a C signal whose elements C1, C2, C4, C8 would equal 0 1 1 1 respectively. This C signal output from FIG. 2A would then be inputted to the circuitry illustrated in FIG. 2B. Examining the circuit element 50 of FIG. 2B, it is apparent that the positive input of the C signal components C2, C4 and C8 would cause circuit element 50 to switch to zero thus causing the input 60 to the damper flip flop 64 to switch to zero or ground.

When the circuitry in FIGS. 2A and 2B indicate that the rotor is one step away from its final destination 10 by causing line 60 to go to ground, the damper flip flop 62 in response to a clock pulse delivered on line 67 will switch states thus generating the damper signal on line 68.

The function of the circuitry shown in FIG. 4 is to apply the damping current to the stepper motor coils. When the damping signal 68 has been received thus indicating the rotor is one step away from its final destination, the damping transistor 70 will permit current to flow through two of the three stator coils 72, 74 and 76 thus placing a damping torque on the rotor. This current will be limited by the current limiting resistor 78 so that the coils will not have their full inductive effect. As in the previously cited Beery U.S. Pat. No. 3,573,589, the coil control signal 16 will cause the appropriate coil drive transistor 80, 82 or 84 to conduct thus permitting the stator winding located at the selected position to remain fully energized so as to pull the rotor to that position during the final step. At the same time the two remaining coils will be energized at approximately half power in response to the damping signal 68. It should also be noted at this point that a zener diode 88 has been added to the coil control circuitry of FIG. 4 to aid in the control of the retro torque as the various stator coils are switched off during the rotation of the motor.

The graph in FIG. 5 has been provided to show the effects on the motor response of switching the damping current on the N±1 position. FIG. 5 then is a plot of the angular displacement of the rotor versus time for each case where one or more steps is required to reach the selected position. The D1 curve represents the case where the motor is only required to move one step while the D7 curve represents the case where the motor must step through seven positions to reach the selected position. Since in D1 the rotor is only moving one position, the damping signal would be switched on immediately 90 resulting in a relatively sluggish movement of the rotor to its new position as indicated by the slope 92 of the D1 curve. On the other hand, however, when it is desired to rotate or step the motor more than one position, such as the seven steps as shown by the response curve D7, the slope 94 of the line D7 indicates a relatively fast rotation until the damping current is switched on one step away 96 from its final position resulting in the arrival at the latter position 98 with no overshoot or oscillation. The fact that the rotation between one position as shown by the response curve D1 or even between two positions as shown by the response curve D2 is relatively sluggish will not affect the overall response of the system since the primary object is to reduce the time of rotation between the greatest number of steps.

I claim:

1. An electrical damping control system for use in a servo control mechanism comprising:
 a plurality of separately energizable induction coils arranged about the axis of a magnetic rotor;
 control means for positioning a magnetic rotor in any selected one of a number of angularly displaced positions by causing said rotor to rotate in the direction requiring the fewest steps to said selected position;
 position indicator means operatively connected to said rotor to indicate the present position of said rotor;
 comparator means operatively connected to said control means and said position indicator to determine when said rotor is one step from said selected position; and
 electrical damping control means responsive to said comparator and operable to apply a damping voltage to said induction coils when said rotor is one step from said selected position, thereby stopping said rotor at said selected position.

2. An electrical damping system for use in a servomechanism comprising:
 a first signal means for indicating the selected position of a servo motor rotor;
 a second signal means for indicating the actual position of said rotor;
 a comparator means for comparing said first signal means with said second signal means to determine when said rotor is one step from said selected position, regardless of direction of rotation; and
 an electrical damping means responsive to said comparator and operable to apply a voltage to each non-energized induction coil of said servomechanism effective to reduce the rate of angular rotation of said rotor one step from said selected position and to stop said rotor at said selected position.

3. The electrical damping mechanism defined in claim 2 wherein said comparator means comprises:
 a first circuit means to compare the states of the binary representations of said first signal means with the states of the binary representation of said second signal means; and
 a second circuit means operatively connected to said first circuit means to compare the binary output of said first circuit means with the binary representations of said second signal means thereby producing a signal indicating when said rotor is one step from said selected position.

4. A logic circuit for determining when the rotor of a servomechanism is within one position of a selected position regardless of direction of rotation comprising:
 a first circuit means to compare binary signals representing the selected position of said rotor with the actual position of said rotor; and
 a second circuit means operatively connected to said first circuit means to compare the output of said first circuit means with said binary signals representing the actual position of said rotor operative to produce a signal when said rotor is within one position of the selected position.

* * * * *

UNITED STATES PATENT OFFICE
CERTIFICATE OF CORRECTION

Patent No. 3,760,252      Dated September 18, 1973

Inventor(s) Jack Beery

It is certified that error appears in the above-identified patent and that said Letters Patent are hereby corrected as shown below:

Col. 4, line 1, change "$B1\ \overline{PC1} + \overline{B1}\ PC1$" to $$--B1 \cdot \overline{PC1} + \overline{B1} \cdot PC1--.$$

Signed and sealed this 1st day of January 1974.

(SEAL)
Attest:

EDWARD M. FLETCHER, JR.
Attesting Officer

RENE D. TEGTMEYER
Acting Commissioner of Patents